INVENTORS
JOHN H. BAKELAAR
DERK J. OLDENBOOM
LORIN T. BLEUER
BY J. W. Armbruster
ATTORNEY July 27, 1954

J. H. BAKELAAR ET AL 2,684,746

CONTINUOUS FORM FEEDING DEVICE

Filed June 6, 1951

INVENTORS
JOHN H. BAKELAAR
DERK J. OLDENBOOM
LORIN T. BLEUER

BY J.W. Armbruster
ATTORNEY

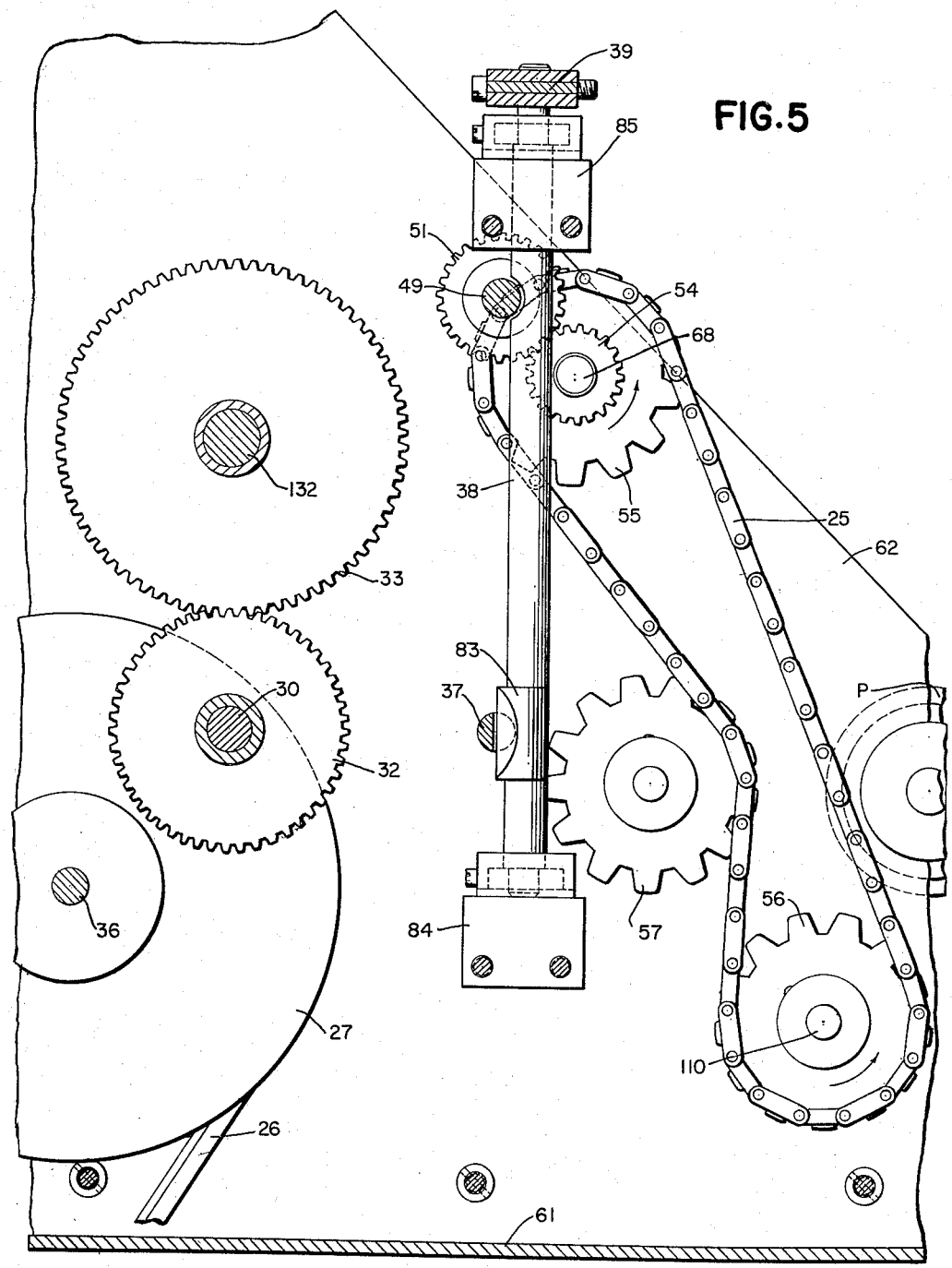

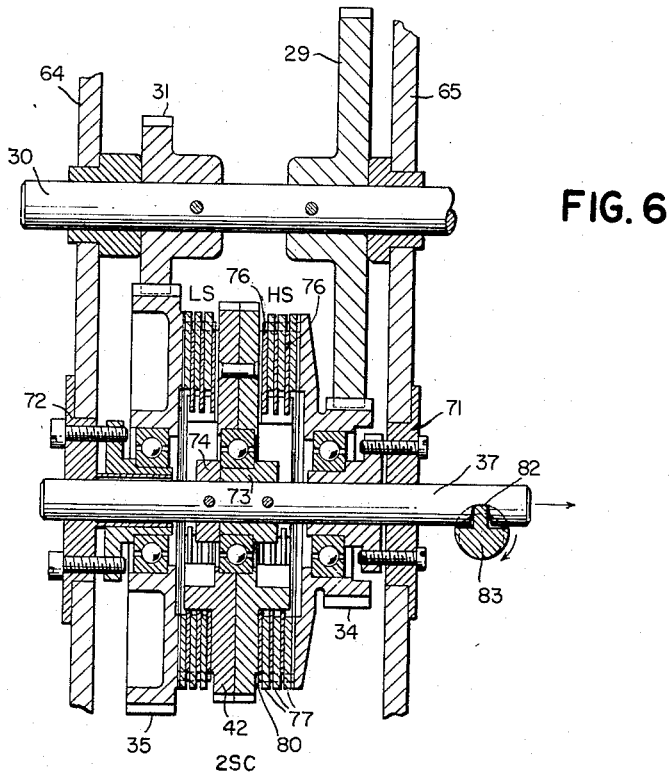
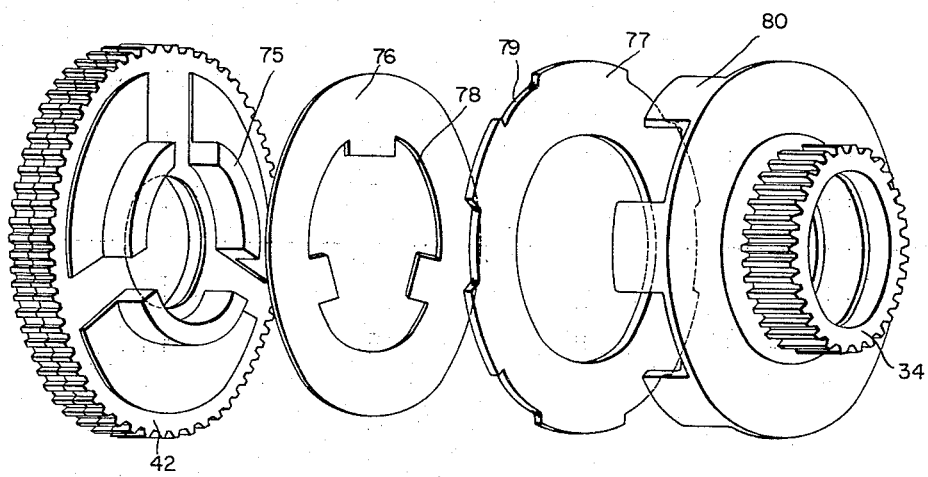

July 27, 1954  J. H. BAKELAAR ET AL  2,684,746
CONTINUOUS FORM FEEDING DEVICE
Filed June 6, 1951  10 Sheets-Sheet 7

INVENTORS
JOHN H. BAKELAAR
DERK J. OLDENBOOM
LORIN T. BLEUER
BY J. W. Armbruster
ATTORNEY July 27, 1954    J. H. BAKELAAR ET AL    2,684,746
CONTINUOUS FORM FEEDING DEVICE
Filed June 6, 1951    10 Sheets-Sheet 8
FIG. 10
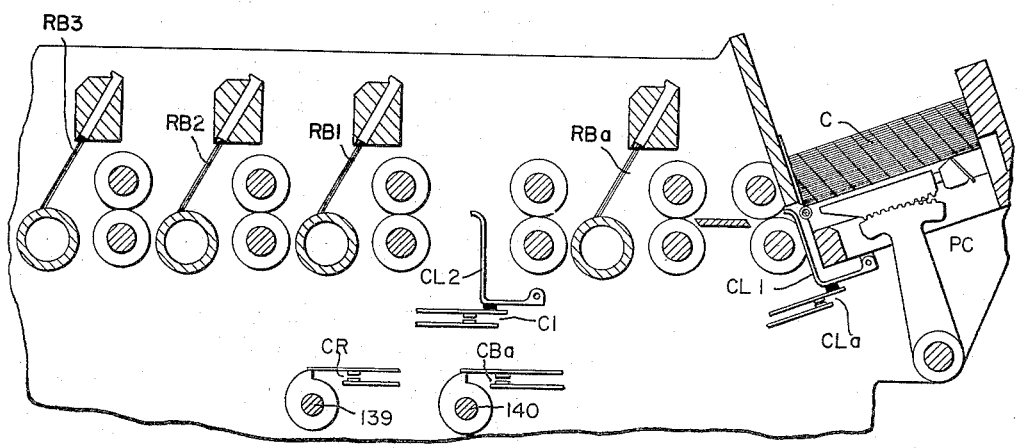
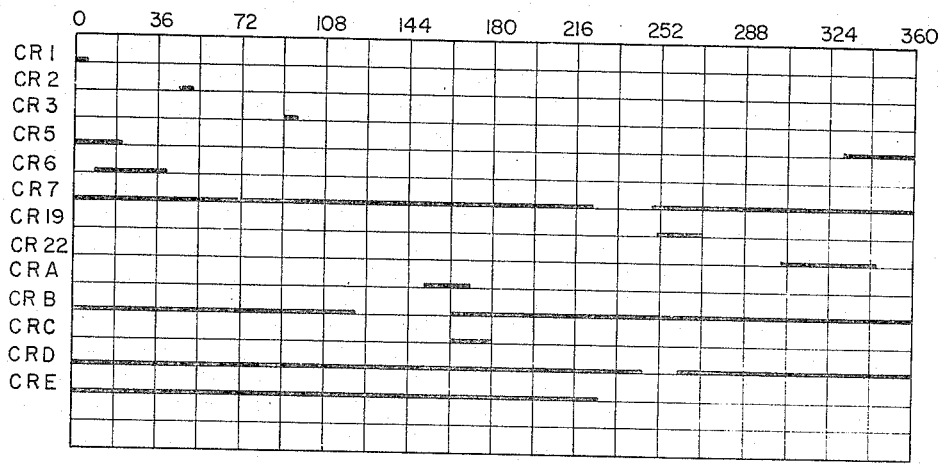
FIG. 11
INVENTORS
JOHN H. BAKELAAR
DERK J. OLDENBOOM
BY LORIN T. BLEUER
ATTORNEY Patented July 27, 1954

2,684,746

UNITED STATES PATENT OFFICE 2,684,746

CONTINUOUS FORM FEEDING DEVICE

John H. Bakelaar, Binghamton, Derk J. Oldenboom, Endicott, and Lorin T. Bleuer, Vestal, N. Y., assignors to International Business Machines Corporation, New York, N. Y., a corporation of New York Application June 6, 1951, Serial No. 230,206

25 Claims. (Cl. 197—133)

This invention relates generally to record feeding devices and more particularly to continuous form advancing devices controlled by a perforated tape and moved with changeable speeds for acceleration and deceleration to attain high speed.

The invention is illustrated as an improvement over tape controlled feed devices of the kind shown in the A. W. Mills et al. Patent 2,531,885, filed on August 9, 1945, and issued on November 28, 1950. It is intended that the record feeding devices work in cooperation with high speed printing machines as exemplified by the copending patent application of A. B. Crowell, Serial No. 227,671, filed on May 22, 1951. The tractor or feed band form of pin feed devices used here are commonly called Formaliners and are illustrated in a number of Mabon patents, one of which is the Mabon Patent 2,179,155, issued on November 7, 1939.

An object of the invention is to provide auxiliary feeding devices suited to cooperate with any electrically controlled high speed printer. The feed device is quite self sufficient with separate drive motor, clutches and control cam contacts, relays, magnets and solenoid. It is suited for coordination with printing devices such as those of a record controlled tabulator by connection through electrical cable for coordination with the printing cycle so that printing and feeding operations follow in the proper sequence.

An object of the invention is the provision of devices for feeding record material of the pin feed variety at high speed. A feature of the construction is that it obtains advantages of good alignment and positioning due to pin feed advancement and at the same time avoids tearing the marginal pin feed perforation areas when operated at high speed.

Another object of the invention is the provision of improved strip feeding clutch devices for improving the style of motion imparted automatically to continuous form stationery. The drive clutch is of the two speed frictional variety and is always started with the slow speed friction discs engaged, and for short movements of one or a few line spaces the slow speed portion of the clutch is the only portion used. In instances of strip advances of over seven line spaces, the clutch drive is automatically shifted to the high speed side of the clutch, so that for advances of one or more inches the movement is quite rapid to keep pace with a high speed printer. Because of a slight amount of slippage in the friction drive of the clutch the change of the feed from rest to slow speed and from slow speed to high speed is leveled off to amount to what is almost a harmonic or sine wave change of rate of speed. The same gradual change from rest to high speed is reversed in the case of stoppage and this is brought about automatically through sensing devices cooperating with a feed control tape. In the usual form of tape feed control, a single perforation in the tape determines the stopping position of the record form and this operation is effective to cause stopping of the form abruptly. However, in the present case short stopping at high speed is not advisable and instead the tape is designed to give both early and final indications of a desired stopping position. An early indication is given shortly before the stopping position is reached and this controls the clutch to shift from high speed down to slow speed operation. This is followed by the complete stoppage of the tape and form by terminating the low speed drive. From the foregoing it is apparent that the record feeding devices operate with harmonic motion at both ends of the feed due to the automatic change from slow to high speed and back again to slow speed accompanied by a certain amount of slippage in the clutch drive which tends to level out the steps of the change in speed.

Another object of the invention is the provision of improved tape feed controls over record advancing clutches. The tape is provided with a pair of indicium for each stopping control to predetermine print receiving positions of the record form synchronized therewith. By employing an early indication of a desired feed position it is possible to shift to an intermediary speed drive connection and automatically control deceleration. Shifting of the speed is controlled by a preenergized solenoid the plunger of which is further controlled by a speed changing type magnet.

Another object of the invention is the provision of devices for engaging a record form on both sides of the platen. In order to feed the record forms rapidly and positively to and away from the platen, the form is engaged by pairs of pin feed tractors both before and after reaching the platen so that there is continuous positive control over the record form throughout its movement to and from the record receiving position.

Another object of the invention is the provision of interlock means for preventing feed stopping control by the perforated control tape while said tape is at rest. This control is provided to eliminate untimely stop control impulses from tape brushes the strands of which might read a tape perforation while the tape is at rest. As soon as spacing control is initiated, the interlock contacts are closed to permit the stopping controls to function thereafter.

Another object of the invention is the provision of electronic feed positioning controls for rapid determination of record form positioning. In cooperation with the indicia of the feed control tape are sensing means including a series of thyratron tubes for rapidly calling into play, clutch shifting and sheet stopping relay controls. Related pairs of speed change and stop control tape brushes are connected to pairs of thyratrons with capacitive coupling to cause rapid circuit changes and consequent rapid speed changes and stops. The feed initiating and stopping controls also have coupled thyratrons for quick line space and long feed initiation and rapid termination thereof.

Another feature of the invention is the provision of two clutches intermediate the driving means and the control tape and record feed devices. The one clutch is of the dual frictional type for speed changing control and the other clutch is of the positive toothed type for precise line spacing and long feed movements. By novel joint control of the clutches it is possible to control fast but accurate positioning of continuous strip stationery.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 5 is a sectional elevation view taken along the line 5—5 in Fig. 3 and shows a portion of the drive gearing and the feed chain between the tractor feed mechanisms.

Fig. 6 is a sectional plan view taken along the line 6—6 in Fig. 3 and shows the interior construction of the two speed friction clutch.

Fig. 7 is an exploded perspective view showing the clutch driving and driven members and a pair of the friction clutch disks or plates arranged as they are assembled in the clutch.

Fig. 10 is a sectional elevation view of the record card feeding portion of a tabulator.

Fig. 11 is a cam chart showing the timing of the electrical controls.

Figure 12A:
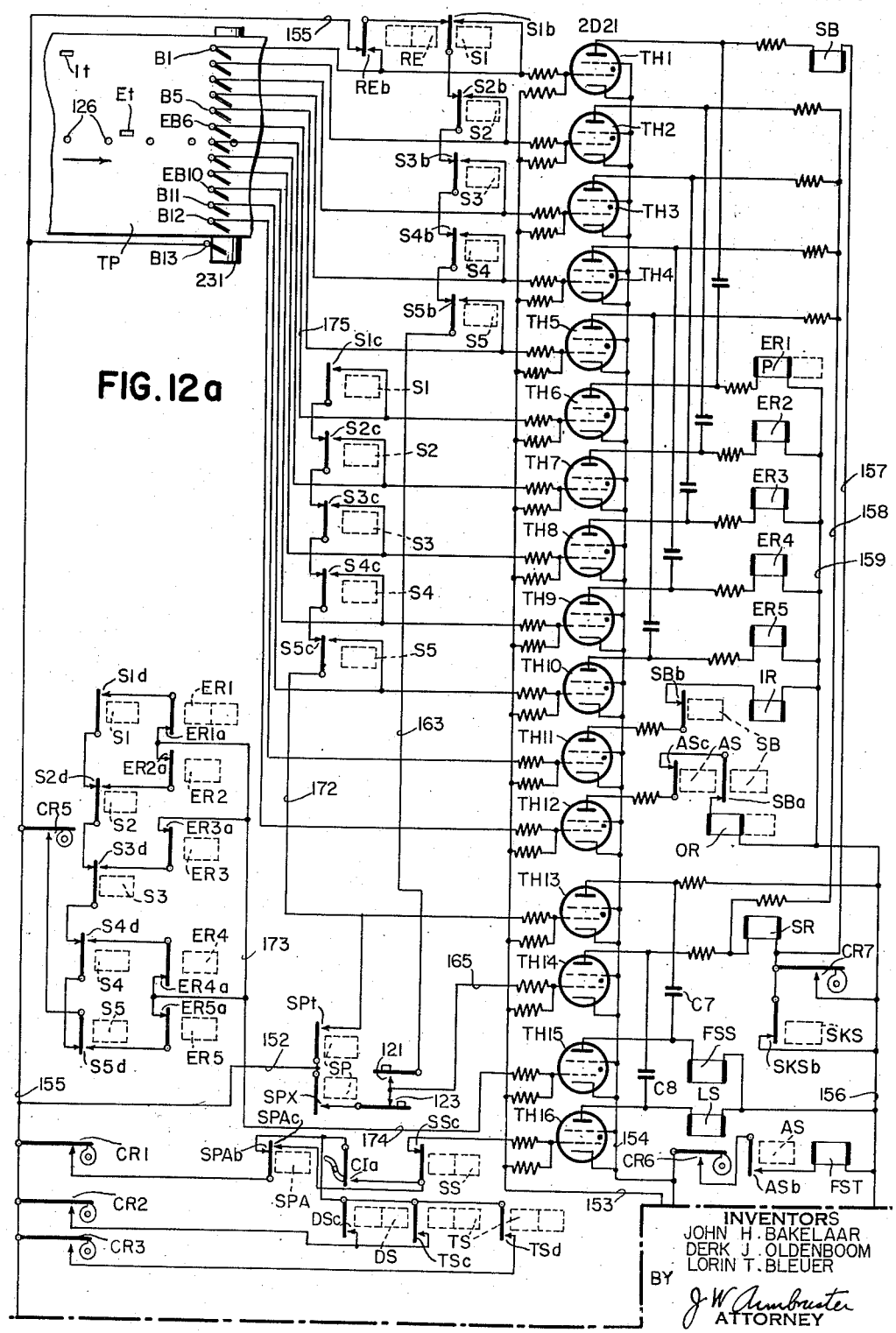
Figure 12B:
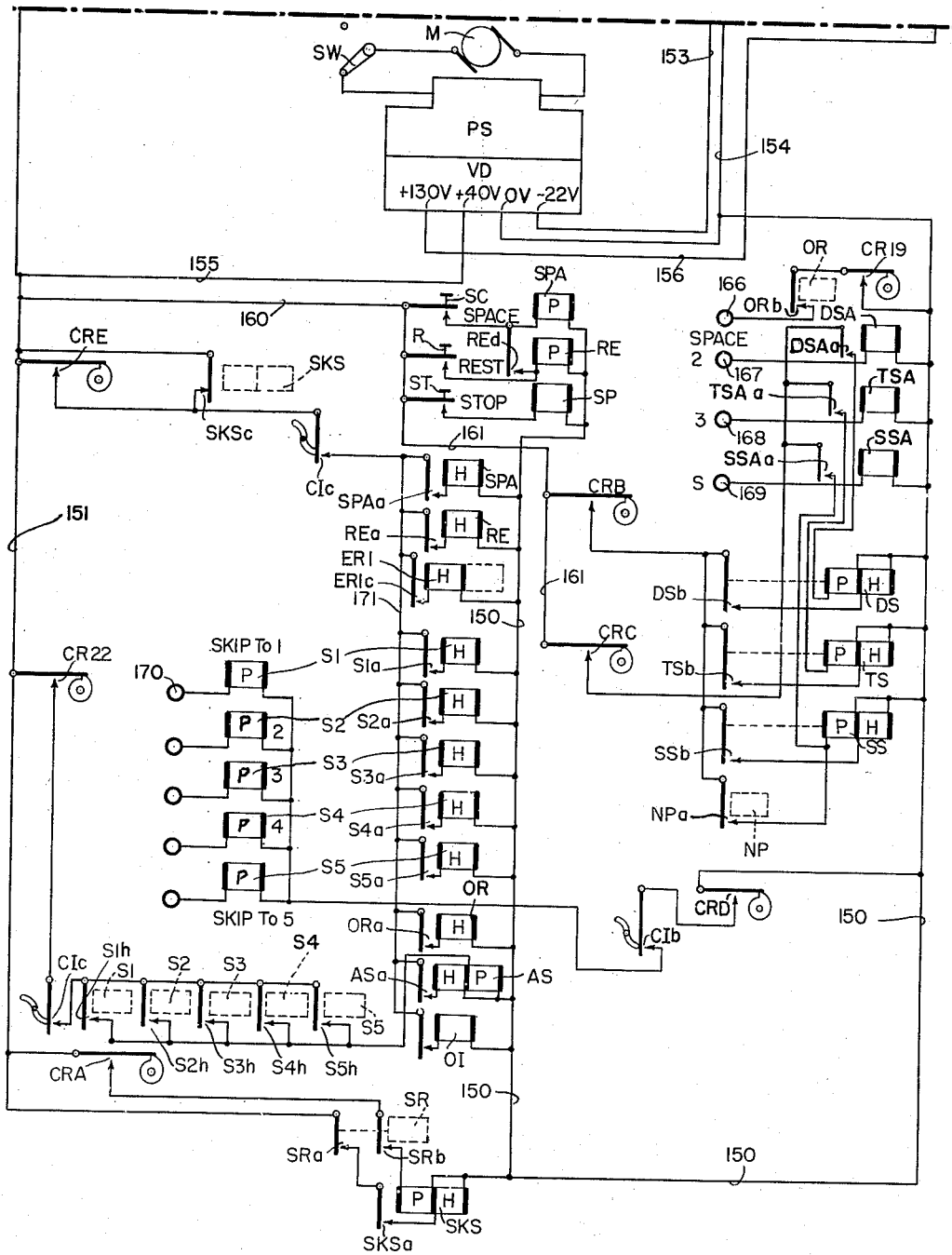

Figs. 12a and 12b when taken together form a wiring diagram of the electrical controls of the feed devices.

Figure 1:
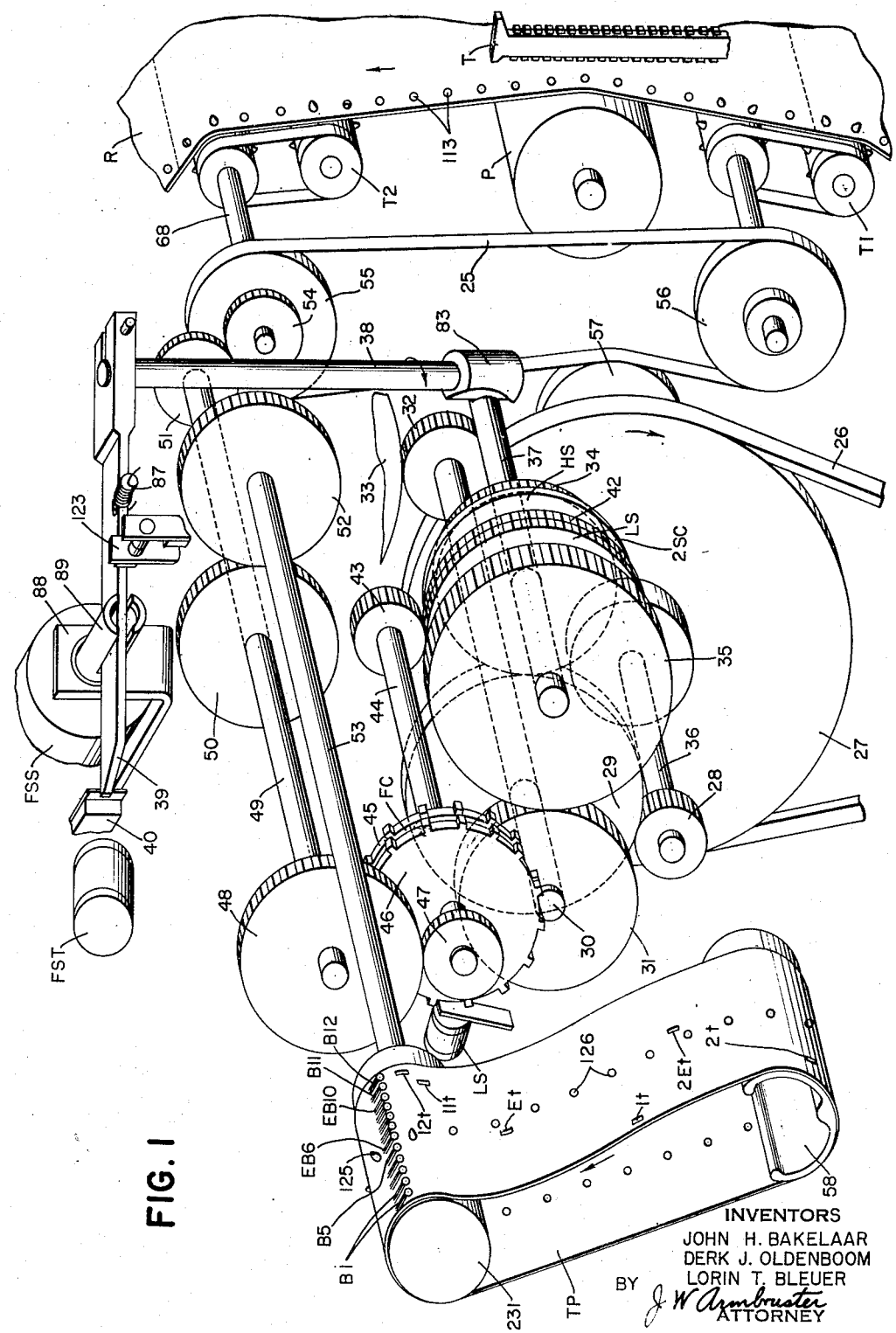
Fig. 1 is a perspective view showing most of the main structural details of the continuous form feeding devices.

As illustrated in Fig. 1 the record strip R is drawn over the platen P and in front of type bars T by pairs of tractor pin feed devices T1 and T2, the former engaging the paper before the platen is reached and the latter engaging the strip above the platen to carry it upward and away from the platen.

The two feeding devices T1 and T2 are connected for movement in synchronism by a chain belt 25. By means of a train of drive gears, a two speed clutch 2SC, and a feed control clutch FC, the motion of the feed devices is synchronized with the advance of the endless feed control tape TP. Cooperating with the tape are sensing brushes B1–5, EB6–10, B11 and B12 for controlling the positioning of the record strip R. The early brushes such as brush EB6 sense an advanced tape perforation E$t$ which is related to a stop perforation I$t$ that is sensed by a brush B1 later in the same feed cycle. Perforation E$t$ is effective first to shift the connections of the two speed friction drive clutch 2Sc back from the high speed side HS to the low speed side LS to slow it down in preparation for stop control which is exercised by perforation I$t$ through brush B1.

The drive connections include a belt 26 which drives a pulley 27 to which is attached a drive pinion 28. Meshing with pinion 28 is a gear 29 which is one of three gears fastened to a shaft 30. The other two gears are 31 and 32, the latter of which drives another gear 33 for rotating circuit breakers and cam contacts.

Gears 29 and 31 drive the opposite sides of the two speed clutch 2SC. Gear 29 drives the high speed gear 34 and gear 31 drives the low speed gear 35 which is the one that is normally effective. A shift to the high speed is effected by an axial movement of the clutch shaft 37 to the right as performed by a twist of a vertical rod 38 keyed thereto. At the top, rod 38 is fixed to the operating arm 39 of a fast speed engaging solenoid FSS which is preenergized to tend to make the shift which is done under control of the armature 40 of a fast speed tripping magnet FST. A normally closed interlock contact 123 opens when the high speed is effective to prevent sudden stopping of the feed while at high speed.

No matter which side of the clutch 2SC is effective, in either instance the drive continues through the clutch and out of it by means of a joined twin gear 42 which is in mesh with a pinion 43 connected by shaft 44 to the continually running side of a feed control clutch FC. When a spacing control magnet LS is energized, the two clutch wheels 45 and 46 are jointed and then the feed drive continues through pinion 47 in mesh with a gear 48. On the shaft 49 to which gear 48 is fastened, are two other gears 50 and 51, the former meshing with a gear 52 on the shaft 53 with the tape feed drum 231, and the latter meshing with the pinion 54 affixed to the top sprocket 55 of the chain drive 25 to lower sprocket 56 for driving the tractor pin feed devices T1 and T2. Sprocket 57 is merely a tension idler. Thus, the record strip R and feed control tape TP always are advanced in synchronism through the common drive gear 48. Tape TP is equal in length, or a multiple of, the form length of the forms on the record strip.

The feeding devices are designed to operate at two speeds, a fast speed for skips of seven line spaces or longer which moves the paper at a rate of 65 inches per second and slow speed for single line spacing or skips of less than seven line spaces which moves the paper at a rate of 13 inches per second. All skips of 3½ inches or less can be accomplished without interlock controls which are sometimes exercised to suspend card feeding and printing of the tabulator to allow time for the paper feed to take place.

For skipping movements greater than seven line spaces the feed devices are designed to start at slow speed, change to fast speed, and return to slow speed before stopping so that the feeding motion is never stopped during high speed operation. This is accomplished automatically through the use of the early brush controls involving a separate set of brushes for the purpose of reading tape perforations such at E*t*, which appear on the control tape at a point seven spaces in advance of the regular stopping perforation l*t*, and the control is effective to cause the feed devices to shift to the slower speed before stopping. In the instances of feed skips of seven spaces or less, the related early brush will read a control perforation in the tape, but at such times the high speed shifting operation did not have time enough to be effected so there is no change from slow speed other than the stop.

The feed devices are controlled to effect a single line space unless otherwise controlled. Double and triple line space operations when called for take precedence over single space operations. Skipping controls for longer spaces take precedence over spacing control and a higher order skip (i. e., one further along the strip) takes precedence over a lower order skip. The latter control is made more evident hereinafter in connection with the description referring to the wiring diagram.

The feed control devices are controlled through the three magnets illustrated in Fig. 1 as follows:

The line space magnet LS when energized connects the feed clutch FC and allows the pin feed tractors to advance the record strip R for one line space of movement in synchronism with the tape. The fast speed engaging solenoid FSS is used whenever a high speed skip is called for in order to change the drive from slow to high speed operation. However, the fast speed strip magnet FST must be energized before the solenoid becomes effective to change from a low to high speed operation. This arrangement allows for a rapid shift from low to high speed because the solenoid may be preenergized prior to skipping time, but the actual shifting of the clutch is controlled by the trip magnet FST shortly after the skipping motion is started.

The foregoing is concerned mainly with the broad outline of the mechanical means and electrical controls of the feed devices. The mechanisms are disclosed more fully with reference to Figs. 2 to 11, before turning to the wiring diagram shown in Figs. 12a and 12b.

Figure 2:
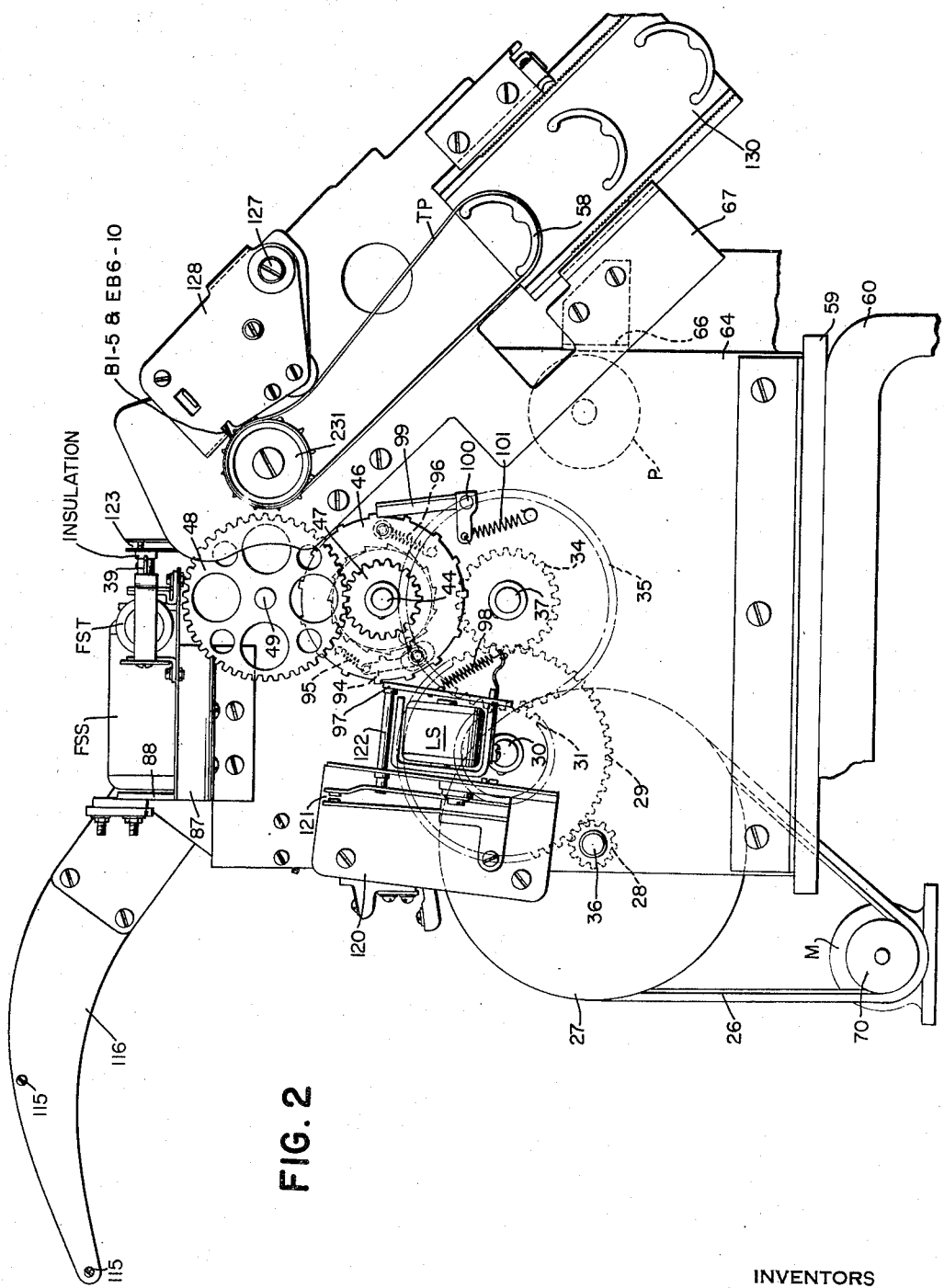
Fig. 2 is a side elevation view showing the driving means, the feed control clutch and the control tape of the feeding devices.
Figure 3:
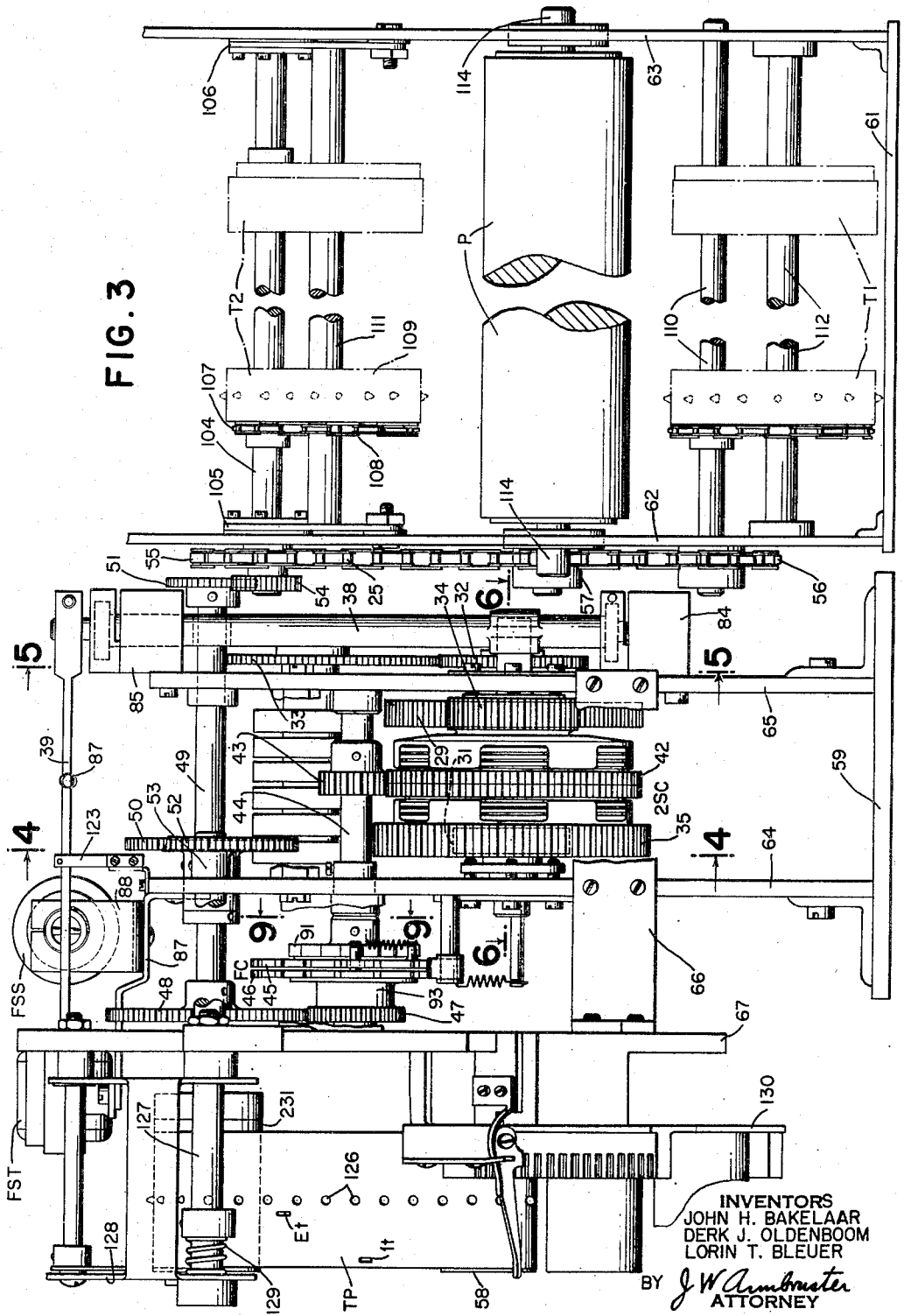
Fig. 3 is a front elevation view showing the control tape, the two control clutches and most of the connecting gearing to the pairs of pin feed tractors for advancing a continuous record form over the platen.

Turning to Figs. 2 and 3 it is seen that the feed devices are supported on a base 60 which is the top of a frame form with legs having casters to control the device to be wheeled into place opposite any printer mechanism and attached thereto so that the type appears opposite the platen. On top of the base 60 are plates 59 and 61 to which the side frames of the apparatus are connected by means of angle irons. In Fig. 3 it is seen that the conveying parts of the mechanism for handling of the record strip are supported between a pair of side frames 62 and 63 fastened to the plate 61. Most of the drive gearing and clutches are arranged between or on the sides of another pair of frames 64 and 65 also secured to the base through the horizontal plate 59. Attached to the two frames 64 and 65 are a number of cross bars 66 from which is suspended another frame 67 carrying the tape feed mechanism.

Referring to Fig. 2 there is seen that the drive mechanism includes a motor M supported on the base 60 and provided with a drive pulley 70 around which is drawn the belt 26. At the upper end, belt 26 is pulled around the drive pulley 27 fastened to a shaft 36 supported in bearings in the frames 64 and 65. Also fastened to shaft 36 is the drive pinion 28 in mesh with the large driving gear 29 fastened to a shaft 30, Fig. 4, also supported by frames 64 and 65. It is seen that shaft 30 also carries a smaller gear 31 which is part of the drive to the two speed clutch 2SC mounted on shaft 37. The two gears 29 and 31 provide the driving means for the friction clutch, the former driving the high speed side of the clutch and the latter actuating the low speed side of the clutch as is more evident in Fig. 6.

In the sectional view of the two speed friction clutch, Fig. 6, it is disclosed that the two driven gears 34 and 35 of the friction clutch are separately mounted on adjustable bearing blocks 71 and 72 fastened to the frames 65 and 64 respectively. These bearing blocks 71 and 72 not only carry the two gears, but also provide a supporting means for an axially adjustable clutch actuating shaft 37 running through the center of the two bearings. At about the mid point of shaft 37 are pinned two collars 73 and 74 for confining the bearing upon which a driving gear 42 is mounted. It is through these collars 73 and 74 that the gear 42 is shifted from the left to the right to compress different sets of friction disks and change from a low speed frictional connection to a high speed frictional drive to get the benefit of the greater rate of speed imparted by the large driving gear 29. The central gear 42 is made up of two similar halves jointed to provide an economical form of clutch disk engaging means having two sets of extending lugs 75, such as those shown in the exploded view, Fig. 7.

In Fig. 7 there is shown only one side of the clutch and only a pair of friction disks, but it is understood that a similar arrangement is on the slow speed side of the clutch and that each side involves a plurality of pairs of clutch disks such as that shown.

Each pair of high speed clutch disks is shaped so that one of the pair cooperates with the drive gear 34 while the adjacent disk is keyed to the driving gear 42. This is evident in Fig. 7 where it is seen that the disk 76 has interior notches 78 adapting it to be keyed to the extending lugs 75 on the driving gear 42. The companion disk 77 is notched at 79 on the periphery to be keyed to the extending lugs 80 on the frame of the drive gear 34.

Normally, pressure is exerted on shaft 37, Fig. 6, tending to move it toward the left, and this causes gear 42 to press against the clutch disk at the left and effect a frictional connection between the slow speed drive gear 35 and the driving gear 42. However, when a high speed feed drive is called for, the shaft 37 is pulled toward the right and then the central gear 42 relieves the pressure normally exerted on the disks at the left and instead presses toward the right against the disks between it and the small drive gear 34. This effects a frictional connection between gear 42 and the large driving gear 29 and causes a substantial increase in the rate of motion imparted to gear 42. The shift from the slow to the fast frictional drive is controlled by an operating solenoid FSS, Fig. 1, and the tripping control magnet FST which are about to be described.

In the sectional view, Fig. 6, it is seen that the shaft 37 is formed with a notch 82 into which there projects part of a specially formed operating member 83, Fig. 5, which is secured to the rod 38 near its lower end. Rod 38 is supported vertically in a pair of bearing blocks 84 and 85, Fig. 3, fastened to the side of frame 65. At its upper end, rod 38 is fastened to, and acts as a fulcrum for, the operating arm 39. This arm is normally pulled in a counterclockwise direction, Fig. 8, by a spring 87 and is stopped in such a position as to cause engagement of the slow speed side of the frictional clutch and at the same time to provide clearance for the engagement of a locking detent which is in the form of an extension on the armature 40 of the fast speed tripping magnet FST. This holding control through armature 40 provides means for preventing clockwise motion of arm 39 and consequent shift to high speed operation until the proper time arrives for the shift.

Whenever the high speed clutch solnoid FSS is energized and made effective, a pair of contacts 123 are opened. These contacts are supported at the lower end on frame 64 and the operating blade tends to open but is normally blocked from doing so by the cooperation of arm 39 with an insulation block thereon. Contacts 123 are used when stopping the machine by use of a manual stop key as described hereinafter with reference to the wiring diagram. They insure that the feed devices are operating at slow sped before being brought to a halt.

Figure 8:
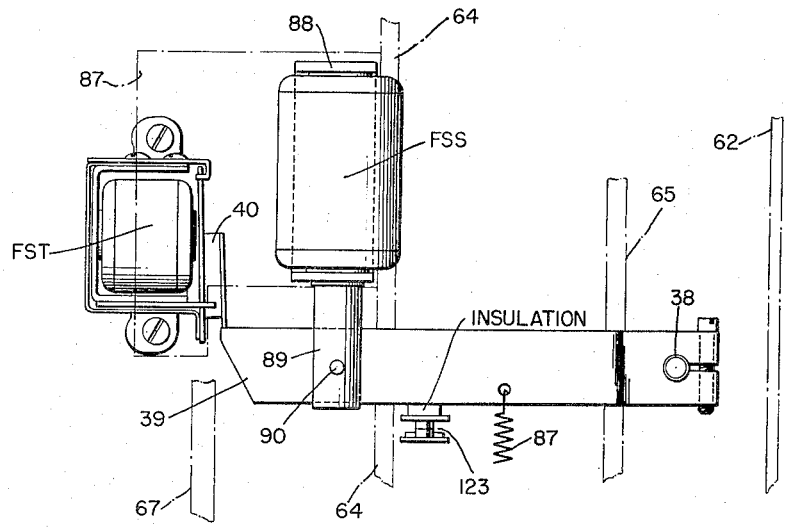
Fig. 8 is a detailed plan view showing the control tripping magnet and the operating solenoid for shifting the clutch connections from slow to fast speed.

Magnet FST is mounted on a bracket 87, Fig. 3, which is fastened to frame 64 and extends to the left with a pair of levels upon the first of which is another bracket 86 supporting the solenoid FSS for operating the high speed shift. Extending through the center of the solenoid, Fig. 8, is the core piece or plunger 89 which is attached near the outer end to the arm 39 by a joining pin 90 passing vertically between the two parts. When the solenoid is energized, the plunger 89 is drawn inward and the arm 39 tends to follow in a clockwise direction. However, the timing is such that initially there is a stopping effect by the armature 40, and motion by the solenoid is not immediately effected. However, as soon as the tripping magnet FST is actuated the armature detent 40 is removed and arm 39 is free to swing in a clockwise direction as urged by the energized solenoid. This causes a turning motion of rod 38, and the effect of this motion is evident in Fig. 6 where it is seen that when the connected member 83 is rotated a slight amount in a clockwise direction, the shaft 37 is pushed toward the right and gear 42 effects a change in direction of the friction disk pressure so that the slow speed drive is disengaged and the high speed drive is engaged.

In either condition of slow speed operation or high speed operation, the drive is conducted beyond the friction clutch 2SC through the cooperation of the clutch gear 42 with a pinion 43 fastened to a shaft 44 at the other end of which is a drive ratchet 91 as shown in Fig. 3. This ratchet 91 is part of another clutch which controls the exact extent of feed motion and the timing of the feed motion to be imparted to the record strip R and the feed control tape TP. This feed control clutch FC is controlled by a magnet LS which is impulsed to provide short line space movements of single, double, or triple motions, or energized over longer periods to provide connection for space skipping operations. Before describing the driving connections beyond the feed clutch it is believed advisable to point out the constructional features of the clutch.

Fixed on shaft 44, Fig. 3, is the ratchet wheel 91 (also see Figs. 2 and 9) which is the drive element of the feed clutch. The driven portion of this clutch includes a sleeve 93 rotatably mounted upon the shaft 44. Sleeve 93 is formed with the gear 47 meshed with the gear 48 on the shaft 49 that carries the drive to the tape and record feed devices. Fixed on sleeve 93 is the toothed disk 46. Positioned between disk 46 and ratchet wheel 91 and freely mounted on sleeve 93 is the other toothed disk 45. Disks 45 and 46 are of the same diameter and provided, respectively, with the same number of teeth 45a and 46a. Projecting from disk 46, Fig. 9, and passing with appreciable play through an elongated slot 45b in disk 45 is the pivot stud 94a of a clutch dog 94. The clutch dog 94 lies in front of the disk 45 and has a tooth 94b engaging the driving ratchet 91. The tail 94c of the clutch dog is rounded at the free end which is seated in a round notch cut in a front rib 45c of the disk 45. A spring 95 connects the clutch dog with a stud projecting from disk 45. Another spring 96 is anchored at opposite ends to studs 45e and 46d of disks 45 and 46 respectively. Springs 95 and 96 urge the disk 45 to turn clockwise relative to disk 46, such relative movement, when permitted, being limited by the play of the hub of the clutch dog in notch 45b of the disk 45. The clockwise movement of disk 45 relative to disk 46 is prevented in the declutched positions of the parts (Fig. 2) by a latch 97 engaged with aligned teeth of the disks. Latch 97 carries the armature of the feed clutch magnet LS and is urged to latching position by a spring 98. A rebound pawl 99 pivoted on a stud 100 is urged counterclockwise, Fig. 2, by a spring 101 against the disk teeth and is constantly maintained effective to prevent reverse movement of the disks 45 and 46.

To effect clutch engagement, magnet LS is energized, withdrawing latch 97 from disks 45 and 46. Springs 95 and 96 now act to turn disk 45 clockwise, Fig. 9, relative to disk 46 and by reason of the pivotal engagement between the disk 45 and the tail 94c of the clutch dog 94 and under the further direct pull of the spring 95, the dog is rocked into engagement with the constantly rotating ratchet 91. Clockwise rotation of the ratchet now is transmitted to disk 46 and through springs 95 and 96 to the disk 45. Sleeve 93 rotates clockwise with disk 46 and through gears 47 and 48 rotates the tape feed and record feed devices. During rotation of the disks 45 and 46, their teeth 45a and 46a are out of alignment, disk 45 having been moved clockwise a limited extent relative to disk 46 upon release of the disks by the latch 97. Deenergization of magnet LS to effect clutch disengagement is timed to occur just before a tooth of disk 45 reaches the latch position. Thus, latch 97 will first encounter a tooth of disk 45 and arrest it while disk 46 continues to turn until a tooth thereof meets the latch 97. While the disk 46 is moving clockwise relative to the arrested disk 45, the clutch dog 94 is gradually withdrawn from ratchet 91 and is rocked free of the ratchet by the time the disk 46 is latched.

Associated with the spacing control magnet LS is a pair of contacts 121, Fig. 2, which are closed only when record feeding is in progress and that is when the tape sensing brushes should be effective. These contacts 121 are mounted on insulation spacers and assembled in the machine on the bracket 120 fastened to frame 64 as the carrier of magnet LS. The contacts are operated by an insulation rod 122 fastened to the upper end of the armature latch 97. Whenever magnet LS is energized to cause connection of the feed clutch, armature latch 97 is pulled to the left and in so doing pushes the rod 122 to the left also, whereupon, near the end of the armature stroke, the contacts 121 are closed. Since the contacts are open when the feed devices are at rest, they prevent the reading of a tape stop perforation in the event that some brush strands should protrude through the perforation and a skip to that particular channel is selected.

It is already noted that gear 48, Fig. 3, is driven whenever the feed clutch FC is engaged. Gear 48 is fixed to one end of the shaft 49 which revolves in bearings in frames 64 and 65 and at its other end carries a gear 51 in mesh with the record feed pinion 54. The upper tractor pair T2 is driven by a shaft 104 which is supported in adjustable bearings 105, 106 fastened to the side frames 62 and 63. Shaft 104 carries small sprockets 107 for driving the short chain belts 108 of the tractor pin feed bands 109. It also extends through frame 62 and carries a large sprocket 55, Fig. 5, next to the drive pinion 54 also secured thereon.

The counterclockwise drive of sprocket 55 is communicated to the lower tractor pair T1 by the chain belt 25 between the sprockets to drive a shaft 110 which not only carries the drive sprocket 56, Fig. 3, but also the smaller sprockets of the tractor pin feed bands of both T1 devices. Guide shafts 111 and 112 hold the feed tractors in place and afford a support for lateral adjustment of the devices to take various widths of the record webs R, Fig. 1, and to be located to register precisely with the marginal pin feed perforations 113.

In Fig. 3 it is seen that the trunnions 114 of platen P are free of attachments and it is adapted to rotate idly in bearings in frames 62 and 63 and merely provide a cushion behind the record webs R, Fig. 1, for taking the printing impressions from the type of typebars T of the printer.

The record web is drawn positively to and away from the platen P with a smooth, graduated but fast motion so that the webs are not torn even at relatively high speeds of line spacing and space skipping between printing impressions. As the web is drawn upward it is supported by wires 115, Fig. 2, spaced laterally and longitudinally between a pair of rearwardly extending arms 116 fastened to the side frames 62 and 63.

Returning now to consideration of the synchronized drive to both the record strip and the feed control tape, it is noted in Fig. 1 that shaft 49, for communicating the drive from the common gear 48 to the strip feed gear 51, also carries a gear 50 to drive gear 52 on the shaft 53 leading into the tape feed unit. At its left end, shaft 53 is connected to the drum 231 which serves not only as a contact drum for the tape brushes but also as a pin feed wheel with pins 125 extending to engage with the central progression of feed perforations 126 in the tape TP.

Pivotally mounted at 127, Fig. 2, on a stud extending from the feed unit frame 67, is the brush holder 128. A spring 129, Fig. 3, tends to swing holder 128, Fig. 2, in a counterclockwise direction and depress the brushes B1–5, etc., in cooperation with the tape and also keep the tape taut. An adjustable box 130 is formed with the semi-circular tape guide 58 and is adapted to receive tape loops of varying lengths.

Figure 4:
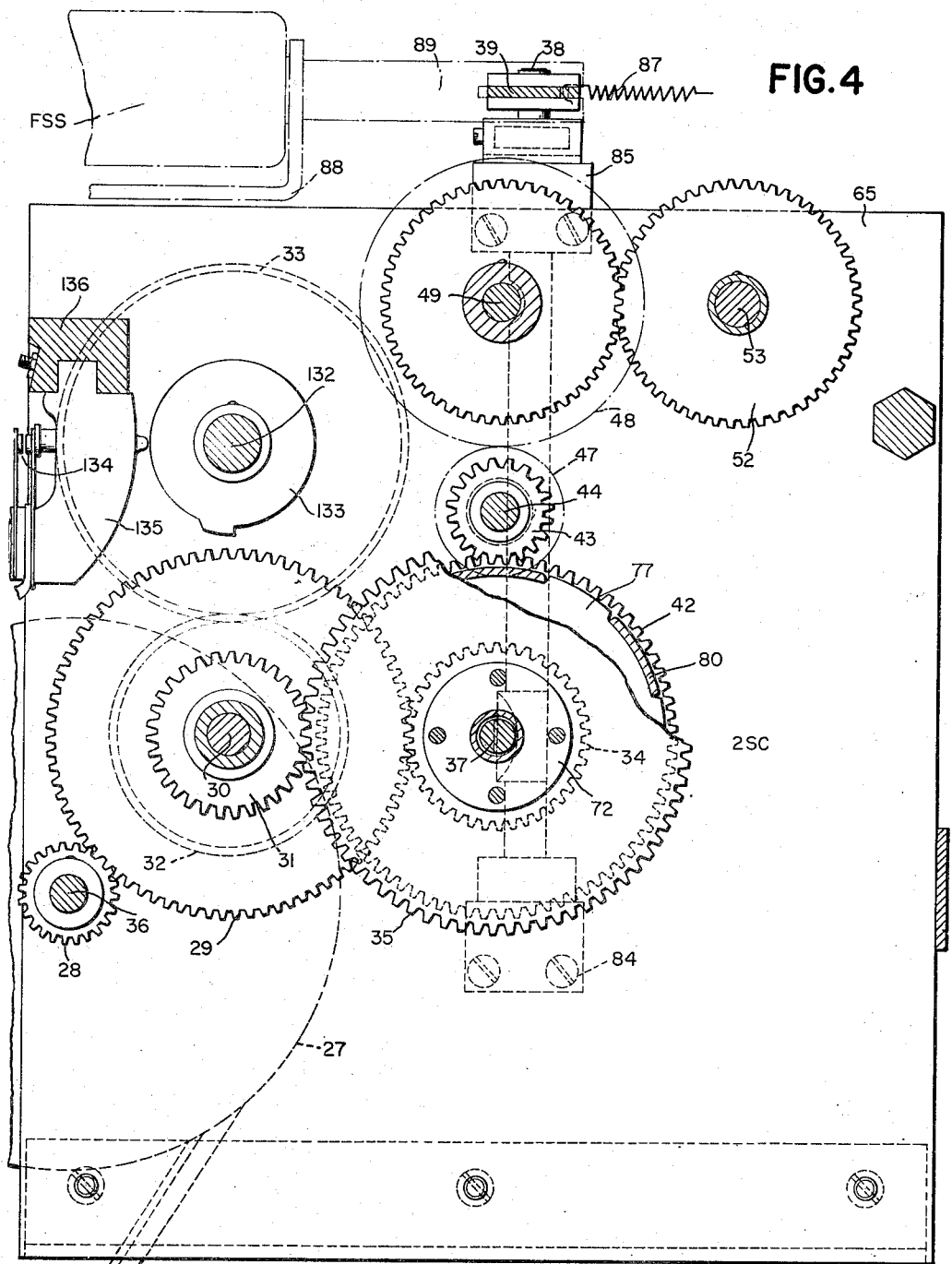
Fig. 4 is a sectional elevation view taken along the line 4—4 and in Fig. 3 and shows the gear connections leading to and from the two speed clutch.

Fastened to a shaft 132, Fig. 4, which also carries the drive gear 33, is a series of cams 133 for separately operating several contacts 134, 134a, etc., mounted in separate holders 135 attached to cross bar 136. Such contacts are used only when the feed device is to be used as a self controlled feeder, i. e., to be more or less independent of the printer or other device for operating on the web. The more usual style of operation, as disclosed hereinafter, is that wherein the control impulses of the feeder, in the main, originate in the tabulator and go into the feeder relays, tubes, magnets and solenoid to effect spacing as determined by the record cards. However, as shown in Fig. 4, the constantly running cams 133 are effective to close contacts 134 at relatively slow speed to cause any regular sequence of self controlled feeding operation of line spacing or space skipping alone or in combination by the impulsing of magnet LS alone or magnets LS and FST along with solenoid FSS for long feed operations at graduated speeds. Of course, one or more of the contacts 134 can be used to time and operate the printer or other operator to synchronize it with the movement of the record web.

Although the typebar T, Fig. 1, is shown as part of a cooperating printing mechanism, it is obvious that other forms of printers may be coordinated with the present feed devices which are suited to be wheeled into place and hooked onto a printer with the platen properly placed. Then, by properly timed impulses to the electrical controls LS, FSS and FST, coordination of printing and web feeding is accomplished.

As an example of the record controlled tabulator, the view in Fig. 10 is illustrative. There it is seen that a magazine is at the right and holds a stack of the usual form of tabulating record cards C, and a picker mechanism PC is provided to issue the cards in succession and feed them past the four lines of sensing station brushes RBa, RB1, RB2 and RB3. This is all explained at length in the accompanying application of A. B. Crowell, Serial No. 227,671, filed on May 22, 1951, and it is sufficient to note here that the cards bear data, group number and special X perforations, the latter usually distinguishing heading cards from detail cards. A change from heading to detail cards, and vice versa is often used as a control from X to no X, or no X to X as an initiating control for the strip feeding devices.

Another form of control is exercised by group control devices in distinguishing changes in group numbers between successive cards. It is usual that one or more total taking operations are initiated thereby and that the feeding devices are also impulsed for skipping to a predetermined line or spacing to separate totals from items.

A certain column of the record cards may be set aside for digit perforations to control record feeding. Such perforations are read through a digit commutator and plugged to the desired tape feed control for spacing or skipping.

Associated with the card feeding devices of Fig. 10 are cam contacts CR and CB operated, respectively, by shaft 139 which is constantly turning, and shaft 140 which turns only on card feeding operations. Thus "all cycle" and "card cycle" impulses are provided for use by plugging to control the strip feeding devices through the tape sensing means in said devices.

Card levers CL1 and CL2, Fig. 10 are operated by passage of the cards C and indicative of the condition of the tabulator to control the feed devices by contacts such as the card controlled contacts CI. These contacts are illustrative of a form of control which at times includes relays picked up through such contacts and held to determine when a first card is in and when the last card is out.

In addition to the patent application of the Crowell tabulating machine referred to hereinbefore, reference may be made to the Mills et al. Patent 2,531,885 and the application of E. J. Rabenda, Serial No. 91,026 filed on May 3, 1949, now Patent No. 2,569,829, for further details of the group control devices, heading card control, program control, multiple line printing controls and other controls originating within the tabulator but productive of impulses which may be used selectively to control the spacing or long feed skipping operations of the record strip feeding devices.

It is noted in Fig. 12b that the double space, triple space, "skip to 1," "skip to 2," etc., are all pluggable to receive the control impulses from the tabulator. They take precedent over each other in the order mentioned. The "skip to" controls refer to the tape brushes, so that when the "skip to 5" control is plugged it means that the fifth tape brush is to sense a tape perforation in the fifth tape channel and that is where the tape and strip is to stop, skipping all other intervening controls. The impulse to any of the pluggable sockets can come from any of tabulator sources of group change unequal impulse, X no X, digit selection, all cycles or card cycles, as already mentioned. Before explaining the various feed control circuits it is believed well to point out more about the tape sensing arrangement.

In Figs. 1 and 12a, it is seen that the feed control tape TP is an endless paper band which is advanced by the pin feed contact drum 231. Cooperating with the tape is a line of twelve sensing brushes of which ten are for stopping control, brush B11 is an interlock release analyzer and brush B12 is an overflow sensing control. Of the ten stopping controls, five brushes EB6–EB10 are set aside to sense advanced tape perforations such as the early indicium E$t$ (which is seven spaces advanced beyond the related stop perforation 1$t$). These early brushes are used to control impulses to cause the two speed feeding clutch controls to shift back from high to slow speed before the stop at the end of a skip. They are also used to pick up early brush relays and prevent high speed operation on skips of less than seven line spaces.

The other five stop brushes B1–B5 are related, respectively, to early brushes EB5–EB10, and serve instead to sense tape perforations such as 1$t$ or 2$t$ and carry impulses to stop controls for effecting a definite stop of the tape and the connected record strip R in predetermined positions. The skip starts wherever dictated by a control impulse from the tabulator and that is determined by the number of lines of a heading, the number of items of an account, the desire to separate headings, the desire to separate parts of an account, or any of the record controlled impulses mentioned hereinbefore. Line spacing is usually carried on independently of the tape perforations, i. e., one or more short impulses to space clutch magnet LS effects short advances of the record. It is ordinarily for advances of four or more spaces that a pair of skip stop perforations are put in the tape to determine where a heading is to start, where item impressions are to start, or where total impressions are to be placed.

Brush B11 is used as a control to determine where it is not necessary to suspend card feeding of the tabulator while an overflow skip or heading area skip is proceeding to the control of perforation 1$t$ of tape channel 1. The tape is punched with perforation 11$t$ to effect the interlock control release when a skip is not a long one such as that of an overflow skip over a long letter head spacing on forms. Perforation 11$t$ is placed 3½" in advance of the stop perforation 1$t$ of channel 1, and since it follows the overflow perforation 12$t$ in the illustration of Fig. 1, the interlock is not released in time because it is more than the allowable 3½" between successive card feed cycles.

When there are too many related items to fit on one form it is necessary to put the overflow items on a second form. In such cases, brush B12 in cooperation with tape perforation 12$t$ determines where the overflow skip is to start. Any predetermined position can be chosen as the last line of a form and the tape punched in the twelfth channel at the corresponding position to initiate overflow skipping.

The feed devices operate at two speeds, fast speed (65" per second) for skips of 7 or more spaces, and slow speeds (15" per second) for line spacing or skips of less than 7 spaces. For skips longer than 7 spaces the feed is started at slow speed, changed to fast speed, and changed back to slow speed 7 spaces before stopping, so that the feed is continuous and with gradual acceleration and deceleration as a harmonic motion without abrupt change to high speed and back to slow speed. The shift to high speed is automatic and invariable on skips of more than 7 spaces, but the shift back to slow speed is tape controlled through an early brush which is impulsed 7 spaces before the stop perforation calls for a definite end to the record advance.

A single space control is the normal operation and will take place invariably unless the feed controls are signalled otherwise. Double and triple space control takes precedence over single space control. All skip controls take precedence over spacing control and a higher order skip takes precedence over a lower order skip.

At the top of Fig. 12b is shown the power source PS and the main lines 150 and 151. Other lines and wires are connected to the voltage divider VD for the different desired levels of electrical potential. The carriage motor M is effective through switch SW and runs continuously while the tabulator and feed unit are in operation.

As the first example of a feed control circuit, the case of an ordinary line spacing operation will be considered. As an accompaniment to every printing operation it is desired to effect controls for line spacing the record strip and also for advancing the feed control tape to be adjusted in synchronism therewith. All tabulator cycles are considered as list cycles unless a "non print" control is called for, and therefore the feed devices will operate on every cycle unless the "space suppress" control is called into play.

Assuming an ordinary list cycle, then the cam contacts CR1, Fig. 12a, are closed early in the cycle and the feed clutch magnet LS is energized by the following circuit for a single line space: starting with the 40 volt line 155, Fig. 12b, and continuing through cam contacts CR1, Fig. 12a, normally closed space controlled contacts SPa (shifted when key control of spacing is desired), closed "1st card" contacts C1a (a form of card lever control insuring that a first card is sufficiently advanced in the tabulator), normally closed space suppression contacts SSc, tube TH16 which is a thyratron of the type of a 2D21 and which is fired through wire 154. Since the line space magnet LS is wired in the plate circuit of the tube TH16 it is energized by an impulse through the tube and wire 156 of 130 volt potential. Magnet LS is energized but momentarily until knocked down by the activation of a stop relay, but it is sustained long enough to engage the clutch pawl 94, Fig. 2, for one step of motion of the feed clutch which motion is equivalent to a line space advance on the record strip.

As soon as the line space armature 97 is attracted to permit spacing, the associated contacts 121, Fig. 2, are closed immediately upon the start of spacing. In order to allow only a single space of motion, the contacts 121, Fig. 12a, are effective at once to pick up a stop relay SR and also fire a tube TH14 which extinguishes the line space tube TH16. The stop relay circuit is closed as follows, Fig. 12a; line 155, normally closed restore relay contacts REb, "skip to 1" normally closed contacts S1b, and then successively through the other normally closed "skip to" contacts S2b, S3b, S4b and S5b, wire 163, the line space armature contact 121, wire 165, tube TH14 which is fired over wire 154 and makes effective its plate circuit with stop relay SR, either cam contacts CR7 or normally closed skip stop contacts SKSb, and line 156. At the same time a pulse is transmitted through the capacitor C9 to extinguish the tube TH16 and thereby deenergizing the connected line space magnet LS and the feed clutch is again disconnected after the record strip has moved only a single line space.

The reason that the firing of tube TH14 extinguishes tube TH16 is as follows:

When tube TH16 is conducting and before tube TH14 conducts, the potential at the plate of tube TH16 is about plus 10 volts and at the plate of tube TH14 is plus 130 volts. This is assuming a ten volt tube drop in tube TH16 and a 110 volt drop across the line space magnet LS. When tube TH14 fires, the potential at the plate of this tube drops from plus 130 volts to plus 10 volts. Because of the capacitive coupling C9 between the plates of tubes TH14 and TH16, this drop of potential appears momentarily at the plate of tube TH16 forcing it to a potential of approximately minus 120 volts. This drops the plate potential below cathode potential which is zero potential and the tube shuts off. This circuit may flip both ways, in other words, tube TH16 may extinguish tube TH14 and vice versa.

It was noted that at the time that the line space magnet LS was deenergized that the stop relay SR was picked up. This relay is effective, as shown in Fig. 12b, to close a pair of contacts SRa and SRb in series with pickup and hold coils of a skip stop control relay SKS. The pickup circuit for this control relay includes line 151, cam contacts CRA, relay contacts SRb, the pickup coil of relay SKS and line 150. The hold circuit passes through line 151, relay contacts SRa, relay contacts SKSa, the hold coil SKS and line 150. The skip stop relay SKS is then effective to open contacts SKSb, Fig. 12a, to break the circuit to the stop relay SR with the cam contacts CR7 open.

When double or triple line spacing movements are required, the line space magnet LS is given additional impulses through extra cam contact wiring prepared by relays under control of the tabulator. Referring to the upper right hand side of Fig. 12b, it is seen that a double space control magnet DSA is wired in series with a plug socket 167. It is to this socket that a direct card control from the card sensing brush CB1, Fig. 10, may be effected by direct plugging, or any of the tabulator impulse emitting connections such as "all cycles" impulses, "card cycle" impulses, group change impulses, etc., may be connected to energize the double space controls whenever the related printing impressions are to be set out by extra spacing. When the double space magnet DSA is so energized it closes contacts DSAa in series with the pickup coil of the double space relay DS and the complete pickup circuit involves line 151, Fig. 12b, wires 160 and 161, cam contacts CRC, magnet contacts DSAa, the pickup coil of relay DS and a wire to line 150. The holding circuit for the relay includes somewhat similar connections through cam contacts CRB, relay contacts DSb, the holding coil of the relay DS and line 150. The pickup of relay DS is delayed by closure of contacts CRC after contacts CR3 so that the double space will not occur until the next cycle. Relays TS and SS are controlled in a similar fashion.

Turning to Fig. 12a it is seen that the double space relay DS closes contacts DSc in series with cam contacts CR2 and the line space magnet LS to effect a second impulse therefrom over connections including wire 155, cam contacts CR2, relay contacts DSc, "first card in" contacts C1a, normally closed space suppression contacts SSc, tube TH16 which when made conductive carries the circuit further through line space magnet LS and wire 156 to the line. When magnet LS is thus energized for the second time, it permits one step of the feed clutch and also operates to close the armature contacts 121 in series with tube TH14, and it is through such connections that the line space clutching operation is terminated to limit the strip advance to just a single second step of movement as described fully hereinbefore.

In the event that a triple line space is desired, then plug connections are made to the socket 168, Fig. 12b, in series with the triple space control magnet TSA. This magnet also has contacts TSAa to call in triple space relay TS with pickup and holding connections through cam contacts CRC and CRB as already traced in connection with the double space control. Triple space relay TS is shown near the bottom of Fig. 12a to exercise control over two contacts TSc and TSd connected respectively to cam contacts CR2 and CR3 which are in series with the line space control tube TH16. When these contacts are closed by the demand for a triple space as initiated by the energization of magnet TSA, three impulses are imparted successively to the line space control magnet LS through cam contacts CR1, CR2 and CR3 over the circuit described hereinbefore.

In the event that a certain tabulator operation is to be free of record strip advance control, such as in the case of non-printing operations, then a space suppression control is called into action to prevent operation of any of the feed clutch controls of the carriage. A plug connection is made to socket 169, Fig. 12b, to carry such a space suppression control impulse through the magnet SSA which closes contacts SSAa in series with the pickup coil of the suppression relay SS. This relay SS has pickup and hold coils wired to cam contacts CRC and CRB similar to the connections already described for relays DS and TS. In addition thereto relay SS is subject to being picked up by the closure of non-print contacts NPa from another tabulator control.

When space suppression relay SS is made effective it serves to open contact SSc, Fig. 12a which has been noted hereinbefore as one of the series connections making possible the spacing circuits through the line space control to tube TH16. Whenever relay SS is energized, the spacing circuit is made ineffective and tabulator cycles may be performed without an accompanying strip feed operation.

Regarding space skipping operations, i. e., operations calling for a strip advance by selection of one or the other of five tape sensing controls at the top of Fig. 12a, it is noted that the five tape brushes B1–B5 cooperate with different channels of the tape TP and it is through the differential spacing of tape perforations cooperating therewith that a choice may be made of the extent of feeding according to various tabulating operations and according to the direction of the plugging therefrom to the five places.

Referring to the center of Fig. 12b it is seen that a series of five "skip to" relays S1–S5 are wired with separate plug sockets such as 170 to make them individually receptive to any of the already identified impulses from the tabulator to select the desired extent of strip feeding to go with particular areas of printing. Assuming for example, that the shortest and first skip feeding control is the one desired, then the plugging will be to socket 170 (from a card brush RBa, Fig. 10, for example, for direct card control) and the relay S1 is picked up by connections including the "first card in" contacts CIb, cam contacts CRD and line 150. A holding circuit is established for relay S1 by the closure of relay contacts S1a, and the complete circuit includes line 155, cam contacts CRE, or skip stop contacts SKSc, card contacts CIc, wire 171, relay contacts S1a, holding coil S1 and line 150.

Relay S1 then serves to operate contacts in several places concerned with the selection of the extent of record feeding. However, the primary purpose of the relay is to select the first and sixth tape sensing brushes B1 and EB6 as effective to cause speed shifting and stopping control.

Along with the selection of any "skip to" control there is made effective an "all skips" relay AS, Fig. 12b, which is seen to be wired to be picked up by the circuit through line 151, cam contacts CR22, card contacts CIc, any of the skip to contacts S1k–S5k, the pickup coil of relay AS and line 150. A hold circuit is established through contacts ASa. Other contacts such as contacts ASb, Fig. 12a, are in circuits involving skipping.

Whenever a skip is called for, the line space magnet LS is energized by the closure of cam contacts CR1 the same as for spacing. However, magnet LS is not immediately deenergized by the closure of related contacts 121 as in spacing. This continuance of feeding is caused by the opening of one of the normally closed "skip to" contacts such as contacts S1b in series with contacts 121 and the disengaged control tube TH14. As a result the feed clutch is engaged and permitted to remain engaged for the full long feed.

If the skip is to be greater than 7 line spaces then the "early brush" controls are ineffective at the beginning of the skip cycle and the fast speed solenoid FSS is energized for use later when the trip magnet FST picks out the time for the speed change as already explained in connection with Fig. 8. A sample circuit for energizing solenoid FSS includes wire 155, Fig. 12a, cam contacts CR5, the various normally closed "skip to" contacts S5d, S4d, S3d and S2d, contacts S1d now closed by relay S1, "early brush" relay contacts ER1a normally closed, wires 173 and 174, tube TH15, solenoid FSS and wire 156 to the power source. Solenoid FSS is not immediately effective because of the latching of its arm 39, Fig. 8, by the armature 40 of magnet FST.

At the beginning of the skip movement, when the feed clutch is tripped by magnet LS, the advance is at slow speed because of the normal arrangement of the two speed clutch 2SC, Fig. 6. However, at 10° when cam contacts CR6 close, the fast speed side of the clutch is called into action by the energization of the fast speed trip magnet FST by a circuit which involves wire 154, cam contacts CR6, "all skips" contacts ASb, magnet FST and wire 156. Magnet FST then releases arm 39, Fig. 1, which is being pulled by solenoid FSS and connected rod 38 effects a shift of the friction clutch effect to the high speed side of clutch 2SC.

When an early perforation Et is sensed for the "skip to 1" control for channel 1 (i. e., by the related EB6 brush of channel 6) then the feed speed controls are shifted back to slow speed as a result of the following circuit. Wire 155, Fig. 12a, common brush B13, contact drum 231, a hole Et in tape TP, brush EB6, wire 175, (a branch circuit through tube TH6 to pick up early relay ER1) another branch through normally open "skip to 1" contacts S1c, now closed, normally closed contacts S2c, S3c, S4c and S5c, wire 172, tube TH13 and wire 156. When tube TH13 is fired it serves to extinguish the related coupled tube TH15 which is prevented from being immediately reenergized by the opening of contacts ER1a, thus deenergizing the fast speed solenoid FSS. As a result, the spring 87, Fig. 1, becomes effective to shift the speed clutch back to the slow speed drive.

The early brush relay ER1 is sustained by a hold circuit shown in Fig. 12b, said circuit including line 151, cam contacts CRE and skip stop contacts SKSc, card contacts CIc, relay contacts ER1c, relay ER1 and line 150.

So far, the skipping operation has involved first, the action of the feed magnet LS to start the feed, and then temporary use of the solenoid FSS to shift into and out of high speed control. Now, the next step is to deenergize the feed magnet LS to stop the record at the selected "skip to 1" position.

Figure 9:
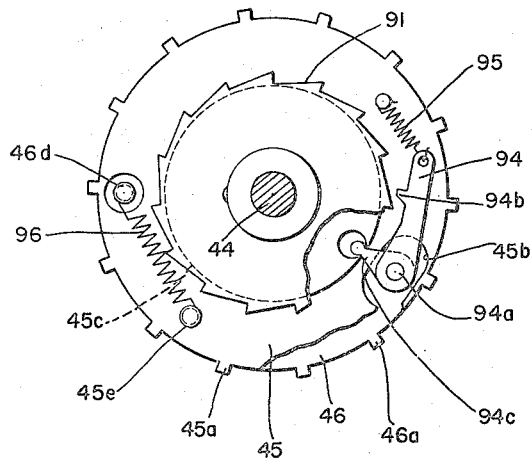
Fig. 9 is a side view of the feed clutch taken along line 9—9 in Fig. 3.

As the tape TP continues to advance with the perforation Et going beyond brush EB6, the related stop perforation 1t eventually comes under stop brush B1 and a circuit is completed to the stop relay SR, and the feed magnet LS is deenergized because of this circuit which is as follows: wire 155, Fig. 12a, common brush B13, contact drum 231, stop perforation 1t in tape TP, stop brush B1, and then in two directions, one of which involves tube TH1 and stop brush magnet SB, and the other of which includes the "skip to" contacts S1b, and then in series through the successive contacts S2b, S3b, S4b and S5b, wire 163, armature contact 121, wire 165, tube TH14, relay SR, cam contacts CR7 and wire 156. As a result of the firing of tube TH14, the coupled tube TH16 shuts off and connected magnet LS is deenergized. In Fig. 9 it is seen that deenergization of magnet LS causes declutching of the feed clutch with the result that the record strip is stopped in a position agreeing with the position of the tape stop perforation 1t. If the skip to channel 1 had been less than 7 line spaces then the early brush relay ER1 would have been picked up early and opened contacts ER1a to prevent the solenoid FSS from becoming energized to shift to high speed.

Although tape channels 1 and 6 are considered in the example given, it is apparent that other pairs of channels and early and stop brushes work in a similar fashion for skips to lower form positions.

As mentioned hereinbefore, the eleventh channel of the tape is sensed to determine whether the anticipated feed to channel 1 is less than 3½ inches and if so to disable the tabulator feed interlock so that card feeding is not suspended. For this control the tape TP is perforated in channel 11 three and one-half inches in advance of the stop perforation 1t of channel 1. When the channel 11 interlock perforation is sensed prior to the channel 1 skip, a circuit is established through brush B11, tube TH11, stop brush contacts SBb and interlock relay IR. The relay IR is then effective in the tabulator as an interlock release until deenergized by the opening of contacts SBb when stop brush B1 senses the stop perforation 1t.

A limit is set up for the number of items which a form is to hold. The overflow tape perforation in channel 12 is usually synchronized with a line near the bottom of the form. When the overflow position is reached, Fig. 12a, the tape perforation in channel 12 comes under brush B12 and a circuit is established to tube TH12 and through "all skips" contacts ASc, stop brush contacts SBa, and overflow relay OR. Relay OR is sustained by energization of its hold coil by the circuit, Fig. 12b, including line 151, cam contacts CRE, card contacts CIc, wire 171, contacts ORa, relay OR and line 150. Relay OR also closes contacts ORb in series with cam contacts CR19 and a pluggable socket 166 which may be connected to the "skip to 1" socket 170 to call relay S1 into operation for an overflow skip operation.

A series of keys are provided for manual control of the feed devices. As shown near the top of Fig. 12b, it is seen that the keys SC, R and ST are connected respectively to close contacts in series with a spacing control magnet SPA, a storing magnet RE and a stopping control magnet SP.

The key ST is provided as an emergency stop device and will terminate feeding immediately upon being depressed. Stop magnet SP controls two contacts SPt and SPx in series with the stopping control to tubes TH13 and TH14. The first mentioned contact is in a circuit involving line 152, stop contacts SPt, tube TH13 and wire 156. Energization of tube TH13 serves to deenergize the coupled tube TH15 which then controls deenergization of the fast speed solenoid FSS. In the event that a high speed drive is in effect when the stopping control is exercised, then the deenergization of the feed clutch magnet LS is not immediately effected because it is desired to slow down the feed before stopping it altogether.

For such slowing down control there is provided the fast engaging contact 123 which is normally closed in series with the stopping contact SPx. However, when the fast speed solenoid FSS is energized, contacts 123 are opened and only close again after the solenoid has been deenergized. Then the stopping circuit is completed as follows: line 152, contacts SPx engaging contact 123, wire 165, tube TH14 and stopping relay SR. Energization of tube TH14 causes deenergization of the coupled tube TH16 which in turn causes deenergization of the feed clutch magnet LS and the feeding operation is thereby terminated.

Whenever the spacing control key SC is used, Fig. 12b, it causes the energization of the pickup coil of the spacing control relay SPA. A hold circuit is provided for the relay SPA through line 151, cam contacts CRE, card contacts CIC, relay contacts SPAa, relay SPA and line 150. Relay SPA then serves to shift contacts SPAc, Fig. 12a to close a shunt circuit around the card contacts CIa, and to establish an impulsing connection to the line spacing control tube TH14 which is impulsed every time cam contacts CR1 close during the time that the spacing control key is held depressed.

The restore key R, Fig. 12b when depressed causes clutch operation through the action of related relay RE which not only starts the feed clutch operating, but also calls into play the tape sensing devices for channel 1 to cause the record strip to be brought into the home position. As soon as the pickup coil of relay RE is energized, the associated contacts REd close and put the spacing control relay SPA in parallel therewith and the spacing operation is initiated by SPAc to activate the feed control magnet LS as already described. The relay RE also closes contacts REa in series with the holding coil to sustain the operation of resetting. Referring to the top of Fig. 12a it is seen that restore relay RE also acts to shift contacts REb to close them in series with the stop brush B1 and normally closed contacts S1b, S2b, etc., wire 163, feed contacts 121, wire 165 and tube TH14 which serves to deenergize the feed tube TH16 and at the same time energize the stop relay SR.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for operating on a record strip, a feed control tape with a plurality of sets of indicia for controlling the positioning of said strip, each of said sets of indicia including a plurality of related indicia corresponding to one position of the strip, means for advancing said strip and said tape in synchronism, means for operating said advancing means at different speeds, means for sensing said indicia, and means under control of said sensing means for operating said advancing means at graduated speeds in bringing said strip to predetermined positions.

2. The combination set forth in claim 1 wherein said advancing means includes a two speed friction clutch and means for shifting said clutch speeds under control of said tape sensing means to change from slow to high and back to slow speed during long feeding operations.

3. The combination set forth in claim 1 wherein each of tape indicia includes a pair of indicia, one of which is in an advanced position on the tape, said advanced indicium when sensed serving to control said shifting means to shift the drive of the friction clutch from high speed to low speed before the other indicium is effective to control said advancing means to cause stopping of the strip.

4. In a machine for operating on a record strip, a feed control tape with indicia for controlling the feeding of the strip, means for advancing said strip and said tape, a driving means, a pair of clutches between said driving means and said advancing means, one of said clutches being of the positive type and the other being of the variable-speed frictional type, means for sensing said indicia, means under control of said sensing means for controlling said friction clutch to control the speed of feeding said strip, and means under control of said sensing means for operating said positive clutch to engage and disengage with the driving means to control stopping positions of said strip.

5. In a machine for recording on a record strip, a platen for supporting said strip to receive recording impressions, a plurality of sets of tractor pin feeding devices cooperating with said strip, a driving means, a pair of clutches between said driving means and said tractor feeding devices, one of said clutches being of the variable-speed type, a feed control tape with indicia for controlling the feeding of said strip, means for sensing said indicia, and means under control of said sensing means for operating said variable-speed clutch to control speed of feeding and the other of said clutches to control the accurate positioning of said strip.

6. In a machine for printing on a continuous record strip having marginal feed perforations, said strip being divided into forms, a platen, a plurality of sets of pin feed devices cooperating with said strip to bring it to and away from the said platen, an endless feed control tape of a length corresponding to the length of one of said strip forms, said tape having feed perforations and strip spacing control perforations, a sprocket wheel engaging said tape feed perforations to advance the tape, connections between said pin feed devices and said sprocket wheel to move them in synchronism, a driving means, a pair of clutches between said driving means and said connections, one of said clutches being of a multi-speed variety and the other being of a positive drive type, and means under control of said tape spacing control perforations for operating said clutches to start and stop said record strip and bring it to predetermined form positions at graduated speeds.

7. In a device for advancing a continuous strip with marginal pin feed perforations, a platen, sets of tractor pin feed devices above and below said platen, drive connections between said sets of tractor devices, and feeding devices cooperating with said driving connections to advance said strip intermittently, said feeding devices including slow and high speed friction clutch means and speed changing means for selecting said slow and high and slow speed clutch means in that sequence during one advance movement of the strip, whereby an advance of the strip is carried on with a harmonic motion.

8. In a record feeding device, a driving means, a two speed clutch, connections between said clutch and a means for advancing said record, clutch speed shifting means cooperating with said clutch, a solenoid for operating said shifting means, means for energizing said solenoid, an armature latch cooperating with said shifting means to prevent operation by said solenoid, a shift control tripping magnet for operating said armature latch, and means for controlling the energization of said tripping magnet to follow after the energization of said solenoid.

9. The combination set forth in claim 8 with record cards bearing feed control indicia, means for sensing said indicia, and means under control of said sensing means for controlling said advancing and speed shifting means to operate short advances at slow speed and long advances of more than seven line spaces at combined slow and fast speed with a slow start and slow finish of the space skip.

10. The combination set forth in claim 8 with a feed control tape bearing speed control indicia, means for sensing said indicia, and means under control of said sensing means for deenergizing said solenoid to restore the speed shifting means.

11. The combination set forth in claim 8 wherein said solenoid energizing means includes a controlling thyratron, a second thyratron connected to said controlling thyratron by capacitive coupling to deenergize said solenoid, key controlled means for making said second thyratron operative, and tape controlled means for making said second thyratron operative to restore the speed shifting means.

12. The combination set forth in claim 8, further characterized by the provision of two sets of friction disks in said clutch, a centralized driving gear between said sets of disks, an axially movable shaft secured to said centralized gear, and a linkage operated by said solenoid to shift said shaft axially to shift the pressure on the disks and change the speed of said clutch.

13. The combination set forth in claim 8 wherein said connections include another clutch of the positive type, said clutch having an operating pawl and ratchet, wheels with regularly spaced teeth and detents therefor, a control magnet, and means for impulsing said magnet to cause line spacing and long feeding operations.

14. In a machine for operating on a record strip, a feed control tape which has feed control indicia placed differentially thereon in two successive diagonal patterns, said indicia being spaced laterally in successive sensing positions and longitudinally in pairs of successive positions representing early and late line space positions, a line of sensing devices extending laterally across the tape, means for advancing said strip and tape in synchronism, means for selecting related pairs of said sensing devices seriatim, and means under control of the selected pairs of sensing devices for feeding said strip to a succession of predetermined positions, said feeding means including speed changing devices the control of which on feeding is varied by the early indicum of related selected pairs of indicia.

15. In a record controlled machine for operating on a strip, said records bearing indicia to control the feed of said strip, means for analyzing said records, a feed control tape with pairs of indicia to control the feed of said strip to various stopping positions, means for sensing the early and late indicium on said tape, means for feeding said strip and said tape in synchronism, means under control of said record analyzing means for selecting a pair of related sensing means one of which detects an early indicium on said tape, a multiple speed feeding means included in said feeding means, means under control of the selected tape sensing means for varying the speed of said feeding means according to the length of the selected feed, and means under control of the related selected tape sensing means in cooperation with said late indicium for controlling said feeding means to stop said strip in predetermined positions related to the control records.

16. In an accounting machine, a control tape with a plurality of columns of indicia placed thereon for control of said machine, means for feeding said tape, two sets of sensing brushes, one brush for each of said columns for sensing said indicia, said indicia appearing in related pairs for early and late operation, two sets of thyratrons connected singly in series with said sensing brushes, a two speed clutch device, magnets for operating said clutch device, relays for controlling operation of said magnets and electrical connections operated by said thyratrons for making said relays effective to control said clutch for speed changing operation at intervals determined by the times that said tape indicia are sensed by related pairs of sensing brushes.

17. In a record feeding device, a feed control tape with pairs of positioning indicia, means for feeding said tape and said record together, means for changing the speed of said feeding means, a fast speed solenoid in said speed changing means, a pair of thyratrons with capacitive coupling and of which the first controls the energization of said solenoid and the second causes the deenergization of said solenoid, separate but related sensing means for sensing a pair of tape indicia, a second pair of coupled thyratrons of which one is connected to one of said sensing means to sense the first of said indicia to fire said second thyratron to deenergize said solenoid and pick up a relay, means under control of said relay for deenergizing said first thyratron to hold deenergized the solenoid in the change from high speed, said second pair of thyratrons also having the other thyratron which extinguishes said one thyratron to again make said solenoid available for speed changing control.

18. In a record feeding device, a line spacing mechanism, a magnet for controlling said mechanism, a pair of capacitive coupled thyratrons the first of which is impulsed to energize said magnet and the second of which is impulsed to deenergize said magnet, means for impulsing said first thyratron to initiate line spacing, and means for impulsing the second thyratron to terminate line spacing.

19. The combination set forth in claim 18 with a pair of contacts operated by said magnet, said means for impulsing said second thyratron including a circuit in which said contacts are connected in series.

20. The combination set forth in claim 18 with means for preventing the operation of said means for impulsing the second thyratron in order to change line spacing into long feeding.

21. The combination set forth in claim 18 with a feed control tape with feed control indicia, means for moving said tape in synchronism with said record, means for sensing tape indicia to control feeding, means for preventing operation of said means for impulsing the second thyratron in order to prevent termination of feeding after a single line space, and means under control of said sensing means for impulsing said second thyratron to terminate feeding after skipping to a long feed position on the record determined by the tape.

22. The combination set forth in claim 18 with a stop key and means under control of said stop key to impulse the second thyratron to terminate feeding.

23. The combination set forth in claim 18 with means for causing the line spacing mechanism to perform long feeding, said means including slow and fast speed drive mechanisms, a stop key, a circuit operated by said stop key to impulse the second thyratron to terminate feeding, means for calling said fast speed mechanism into operation for part of a long feed operation, and normally closed contacts in said circuit which are opened by said fast speed mechanism while it is in operation to prevent abrupt stoppage of the feed during fast feeding.

24. The combination set forth in claim 18 wherein said means for impulsing said first thyratron includes double, triple and impulse suppression devices, control cards bearing spacing control indicia, means for sensing said indicia, and means under control of said sensing means for selectively operating said double, triple or suppression device to eliminate or increase the line space feed.

25. In a record controlled machine for operating on a continuous strip, said records bearing long feeding control indicia, devices for sensing said record control indicia, means for spacing and long feeding said strip, a feed control tape with a series of longitudinal channels with separate spaced indicia in said channels to determine extents of long feeding motion, said tape being connected to said strip feeding means to move therewith, a series of tape sensing brushes for reading said tape indicia, means under control of the record sensing devices for selecting one of said tape sensing brushes to control feeding, a magnet for controlling said feeding means, a pair of capacitive coupled thyratrons the first of which is impulsed to energize said magnet and the second of which is impulsed to deenergize said magnet, means for impulsing said first thyratron to initiate feeding, and means under control of the selected one of said tape sensing brushes to impulse said second thyratron to terminate long feeding at a position determined by the related indicium on the feed control tape.

References Cited in the file of this patent

UNITED STATES PATENTS

| Number | Name | Date |
| --- | --- | --- |
| 2,531,885 | Mills et al. | Nov. 28, 1950 |
| 2,604,262 | Phelps et al. | July 22, 1952 |